(12) United States Patent
Petersen et al.

(10) Patent No.: US 9,082,077 B2
(45) Date of Patent: Jul. 14, 2015

(54) MOBILE PRIVATE ASSISTED LOCATION TRACKING

(75) Inventors: Steven L. Petersen, Los Gatos, CA (US); Christopher M. Amidon, Apex, NC (US)

(73) Assignee: Waldeck Technology, LLC, Wilmington, DE (US)

( * ) Notice: Subject to any disclaimer, the term of this patent is extended or adjusted under 35 U.S.C. 154(b) by 1374 days.

(21) Appl. No.: 12/713,508

(22) Filed: Feb. 26, 2010

(65) Prior Publication Data

US 2012/0042046 A1 Feb. 16, 2012

Related U.S. Application Data

(60) Provisional application No. 61/163,091, filed on Mar. 25, 2009.

(51) Int. Cl.
*G06F 15/16* (2006.01)
*G06N 5/04* (2006.01)
(Continued)

(52) U.S. Cl.
CPC ............ *G06N 5/04* (2013.01); *G06Q 30/0282* (2013.01); *H04W 4/02* (2013.01); *H04W 4/028* (2013.01); *H04W 12/02* (2013.01)

(58) Field of Classification Search
CPC ....... H04W 4/02; H04W 4/028; G01S 5/0027
USPC ....................................... 709/219; 455/456.1
See application file for complete search history.

(56) References Cited

U.S. PATENT DOCUMENTS 5,493,692 A 2/1996 Theimer et al.
5,682,525 A 10/1997 Bouve et al.
(Continued)

FOREIGN PATENT DOCUMENTS

CN 1776684 A 5/2006
CN 101118162 A 2/2008
(Continued)

OTHER PUBLICATIONS

Amin, Saurabh et al., "Mobile Century—Using GPS Mobile Phones as Traffic Sensors: A Field Experiment," 15th World Conference on Intelligent Transportation Systems, Nov. 16-20, 2008, New York, New York, available from <http://www.ce.berkeley.edu/~bayen/conferences/its08.pdf>, 4 pages.
(Continued)

*Primary Examiner* — Douglas Blair

(57) ABSTRACT

Systems and methods are disclosed for providing private location tracking. In general, a location-aware mobile device includes a location broker. Over time, as a location of the mobile device changes, the location broker generates a number of route fragments each defining the location of the mobile device over a corresponding period of time. The location broker obfuscates the route fragments and sends the obfuscated route fragments to a remote server for storage. At some point, the location broker receives a location tracking request from a requestor. In response, the location broker processes the location tracking request such that one or more obfuscated route fragments that are relevant to the location tracking request are obtained from the remote server and de-obfuscated to recover the corresponding route fragments. The recovered route fragments may then be utilized by the requestor.

16 Claims, 9 Drawing Sheets

(51) Int. Cl.
*G06Q 30/02* (2012.01)
*H04W 4/02* (2009.01)
*H04W 12/02* (2009.01)

(56) References Cited

U.S. PATENT DOCUMENTS

| | | | |
|---|---|---|---|
| 5,748,148 A * | 5/1998 | Heiser et al. | 342/457 |
| 5,754,939 A | 5/1998 | Herz et al. | |
| 5,802,492 A | 9/1998 | DeLorme et al. | |
| 6,014,090 A | 1/2000 | Rosen et al. | |
| 6,049,711 A | 4/2000 | Ben-Yehezkel et al. | |
| 6,321,158 B1 | 11/2001 | DeLorme et al. | |
| 6,349,203 B1 | 2/2002 | Asaoka et al. | |
| 6,542,749 B2 | 4/2003 | Tanaka et al. | |
| 6,549,768 B1 | 4/2003 | Fraccaroli | |
| 6,618,593 B1 | 9/2003 | Drutman et al. | |
| 7,123,189 B2 * | 10/2006 | Lalik et al. | 342/357.31 |
| 7,130,740 B2 * | 10/2006 | Vanegas et al. | 701/520 |
| 7,149,625 B2 | 12/2006 | Mathews et al. | |
| 7,236,799 B2 | 6/2007 | Wilson et al. | |
| 7,271,742 B2 | 9/2007 | Sheha et al. | |
| 7,283,628 B2 * | 10/2007 | Stein et al. | 380/29 |
| 7,333,820 B2 * | 2/2008 | Sheha et al. | 455/457 |
| 7,538,691 B2 | 5/2009 | Horstemeyer | |
| 7,617,542 B2 * | 11/2009 | Vataja | 726/30 |
| 7,624,024 B2 | 11/2009 | Levis et al. | |
| 7,694,156 B2 * | 4/2010 | Gammel et al. | 713/194 |
| 7,912,642 B2 | 3/2011 | Zhao et al. | |
| 8,000,726 B2 * | 8/2011 | Altman et al. | 455/456.3 |
| 8,073,140 B2 * | 12/2011 | Shirai et al. | 380/29 |
| 8,249,807 B1 * | 8/2012 | Barbeau et al. | 701/490 |
| 8,255,393 B1 * | 8/2012 | Yu et al. | 707/724 |
| 8,284,934 B2 * | 10/2012 | Rahman et al. | 380/44 |
| 8,417,266 B2 * | 4/2013 | Kim et al. | 455/457 |
| 8,473,729 B2 * | 6/2013 | Trethewey et al. | 713/2 |
| 2003/0105585 A1 | 6/2003 | Ukita | |
| 2003/0126100 A1 | 7/2003 | Chithambaram | |
| 2004/0106415 A1 | 6/2004 | Maeda et al. | |
| 2004/0186661 A1 | 9/2004 | Barton | |
| 2004/0192339 A1 | 9/2004 | Wilson et al. | |
| 2004/0203902 A1 | 10/2004 | Wilson et al. | |
| 2004/0203903 A1 | 10/2004 | Wilson et al. | |
| 2004/0224702 A1 | 11/2004 | Chaskar | |
| 2005/0064864 A1 | 3/2005 | Horton et al. | |
| 2005/0102098 A1 | 5/2005 | Montealegre et al. | |
| 2005/0278371 A1 | 12/2005 | Funk et al. | |
| 2006/0047568 A1 | 3/2006 | Eisenberg et al. | |
| 2006/0085419 A1 | 4/2006 | Rosen | |
| 2006/0161599 A1 | 7/2006 | Rosen | |
| 2006/0227047 A1 | 10/2006 | Rosenberg | |
| 2006/0265121 A1 | 11/2006 | Kuo et al. | |
| 2006/0287815 A1 | 12/2006 | Gluck | |
| 2007/0050129 A1 | 3/2007 | Salmre | |
| 2007/0078596 A1 | 4/2007 | Grace | |
| 2007/0083428 A1 | 4/2007 | Goldstein | |
| 2007/0093955 A1 | 4/2007 | Hughes | |
| 2007/0118278 A1 | 5/2007 | Finn et al. | |
| 2007/0124157 A1 | 5/2007 | Laumeyer et al. | |
| 2007/0155416 A1 | 7/2007 | Donnellan | |
| 2007/0159299 A1 | 7/2007 | Tsai | |
| 2007/0168888 A1 | 7/2007 | Jawerth | |
| 2007/0202844 A1 | 8/2007 | Wilson et al. | |
| 2007/0244633 A1 | 10/2007 | Phillips et al. | |
| 2007/0255831 A1 | 11/2007 | Hayashi et al. | |
| 2007/0260393 A1 | 11/2007 | Abernethy et al. | |
| 2008/0004043 A1 | 1/2008 | Wilson et al. | |
| 2008/0027643 A1 | 1/2008 | Basir et al. | |
| 2008/0030376 A1 | 2/2008 | Tunnell et al. | |
| 2008/0048856 A1 | 2/2008 | Culpepper et al. | |
| 2008/0134088 A1 | 6/2008 | Tse et al. | |
| 2008/0146157 A1 | 6/2008 | Aaron | |
| 2008/0177469 A1 | 7/2008 | Geelen et al. | |
| 2008/0188246 A1 * | 8/2008 | Sheha et al. | 455/457 |
| 2008/0195428 A1 | 8/2008 | O'Sullivan | |
| 2008/0262717 A1 | 10/2008 | Ettinger | |
| 2008/0280626 A1 * | 11/2008 | Choi et al. | 455/456.1 |
| 2009/0103722 A1 | 4/2009 | Anderson et al. | |
| 2009/0111438 A1 | 4/2009 | Chan | |
| 2009/0143984 A1 | 6/2009 | Baudisch et al. | |
| 2009/0182492 A1 | 7/2009 | Alten | |
| 2009/0224970 A1 * | 9/2009 | Tsau | 342/357.09 |
| 2009/0239552 A1 | 9/2009 | Churchill et al. | |
| 2010/0030459 A1 | 2/2010 | Geelen et al. | |
| 2010/0217525 A1 | 8/2010 | King et al. | |
| 2010/0250727 A1 * | 9/2010 | King et al. | 709/224 |
| 2012/0046860 A1 | 2/2012 | Curtis et al. | |

FOREIGN PATENT DOCUMENTS

| | | |
|---|---|---|
| WO | 03/081391 A2 | 10/2003 |
| WO | 2009/045262 A2 | 4/2009 |
| WO | 2009/070368 A1 | 6/2009 |

OTHER PUBLICATIONS

"Club TomTom," at <http://www.clubtomtom.com/general/get-to-know-tomtom-mapshar0%E2%84%A2/>, Jul. 31, 2007, copyright TomTom, printed Mar. 12, 2010, 9 pages.

"NAVTEQ: The secrets behind Ovi Maps," at <http://noknok.tv/2009/07/08/navteq-the-secrets-behind-ovi-maps/>, Jul. 8, 2009, copyright 2007-2010, Republic Publishing Ltd, printed Mar. 12, 2010, 6 pages.

"Tele Atlas Leverages Community Input to Add New Roads and Location Content," at <http://www.teleatlas.com/WhyTeleAtlas/Pressroom/PressReleases/TA_CT031226>, Jun. 22, 2009, Gent, Belgium, copyright 2010, Tele Atlas BV, printed Mar. 12, 2010, 2 pages.

"TomTom Map Share technology," at <http://www.tomtom.com/page/mapshare>, copyright 2009, TomTom International BV, printed Mar. 12, 2010, 3 pages.

Abstract, CN 101118162 A, published Feb. 6, 2008, Applicant: E Ten Information Sys Co Ltd, Inventor: Shicheng Huang, printed from www.espacenet.com on Jun. 9, 2011, 1 page.

Choney, Suzanne, "Mobile services mushroom for locating friends," Aug. 14, 2008, copyright 2008, MSNBC.com, 1 page.

"dodgeball.com :: mobile social software," at <http://www.dodgeball.com/>, copyright 2008, Google Inc., printed Jan. 16, 2008, 1 page.

Jones, Q. et al., "Urban Enclave Location-Aware Social Computing," Proceeds of Internet Research 7.0: Internet Convergences, Brisbane, Australia, Sep. 27-30, 2006, found at <http://aoir.org/files/c4d0c2e397e8a5ddb140a4017fa9.pdf>, 10 pages.

Millonig, A. and Schechtner, K., "Developing Landmark-based Pedestrian Navigation Systems," Proceedings of the 8th International IEEE Conference on Intelligent Transportation Systems, Vienna, Austria, Sep. 13-16, 2005, copyright 2005, IEEE, 6 pages.

"MySpace," at <http://www.myspace.com/>, copyright 2003-2008, MySpace.com, printed Jan. 16, 2008, 2 pages.

"TrackItBack—The World's Largest Lost & Found Recovery Service | News," articles dating from Mar. 29, 2005, to Jun. 27, 2008, found at <http://www.trackitback.com/portal/press.html>, copyright 2003-2011, TrackItBack, printed on Apr. 18, 2011, 4 pages.

"About Google Map Maker," at <http://sites.google.com/site/mapmakeruserhelp/home>, printed May 21, 2009, 1 page.

"AirSage's WiSE Technology," at <http://www.airsage.com/site/index.cfm?id_art=46598&actMenuItemID=22134&vsprache/EN/AIRSAGE_WiSE_TECHNOLOGY_L.cfm>, viewed as early as Mar 22, 2010, company founded in May 2000, 1 page.

Ardagna, C.A. et al., "Location Privacy Protection Through Obfuscation-based Techniques", Lecture Notes in Computer Science, 2007, vol. 4602, pp. 47-60, Data and Applications Security XXI, Jul. 8-11, 2007, Redondo Beach, California, 16 pages.

Bruntrup, R. et al., "Incremental Map Generation with GPS Traces," Presentation Slides, University of Dortmund, Germany, 2005, found at <http://www.google.com/url?sa=t&rct=j&q=bruntrup%20incremental%20map%20generation&source=web&cd=2&ved=0CCoQFjAB&url=http%3A%2F%2Fmapgeneration.berlios.de%2Ftiki%2Ftiki-download_wiki_attachment.php%3FattId%3D1&ei=ZruVT_

(56) References Cited

OTHER PUBLICATIONS

O8J9L16AGV-LGKBA&
usg=AFQjCNF4B61uAHpAjtDc46FyNLqw4bgl1A>, 16 pages.
Bruntrup, R., et al., "Incremental Map Generation with GPS Traces," in Proc. of the IEEE Conference on Intelligent Transportation Systems, Sep. 13-16, 2005, Vienna, Austria, pp. 574-579, copyright 2005, IEEE, 7 pages.
Davies, J. J. et al., "Distributed, vehicular computation for map generation," presentation slides, 2007 Annual Meeting of the Association of American Geographers, Apr. 2007, found at <http://www.cl.cam.ac.uk/research/dtg/www/files/publications/public/jjd27/davies-aag07.pdf>, 21 pages.
Davies, J. J. et al., "Scalable, Distributed, Real-Time Map Generation," Pervasive Computing, vol. 5, No. 4, Oct.-Dec. 2006, pp. 47-54, copyright 2006, IEEE, 9 pages.
Ekpenyong, F. et al., "Updating of Road Network Databases: Spatio-Temporal Trajectory Grouping Using Snap-Drift Neural Network," In Proceedings of International Conference on Engineering Applications of Neural Networks, EANN 2007, Aug. 29-31, 2007, Thessaloniki, Greece, 10 pages.
Abstract, Ekpenyong, F., Palmer-Brown, D., and Brimicombe, A., "Extracting road information from recorded GPS data using snap-drift neural network," Neurocomputing, vol. 73, Issues 1-3, Dec. 2009, pp. 24-36, 6 pages.
"Fire Eagle : What is Fire Eagle?", found at <http://fireeagle.yahoo.net/help> on the Internet Archive, dated Jul. 9, 2011, copyright 2007-2011, Yahoo! Inc., printed Nov. 10, 2011, 4 pages.

"Fire Eagle," at <http://fireeagle.yahoo.net>, copyright 2007-2011, Yahoo! Inc., printed Apr. 28, 2011, 2 pages.
"Intel and ARM collaborate on device security", Oct. 15, 2007, at <http://www.windowsfordevices.com/news/NS5120676853.html>, copyright 1996-2010, Ziff Davis Enterprise Holdings, Inc., printed Apr. 20, 2012, 5 pages.
Jones, M., "Matt's Wikimapia Blog," Sep. 15, 2006, at <http://wikimapia.mattjonesblog.com/2006/09/15/how-to-1-adding-a-new-place/>, printed May 21, 2009, 24 pages.
"OpenStreetMap," <http://www.openstreetmap.org/>, printed May 21, 2009, 1 page.
Privat, Ludovic, "NAVX: 'We provide Content to TomTom, Garmin and Mio,'" GPS Business News, Feb. 2, 2009, at <http://www.gpsbusinessnews.com/NAVX-we-provide-content-to-TomTom,-Garmin-and-Mio-_a1305.html>, printed Apr. 20, 2012, 2 pages.
Priya Ganapati, "Navigation Companies Crowdsource Maps, Traffic Services," Feb. 11, 2009, at <http://www.wired.com/gadgetlab/2009/02/user-generated/>, printed May 21, 2009, 4 pages.
Shankland, Stephen, "Google crowdsources maps directions, too," Mar. 11, 2009, at <http://news.cnet.com/8301-17939_109-10193481-2.html>, printed May 21, 2009, 3 pages.
"WikiMapia," Wikipedia, at <http://en.wikipedia.org/wiki/WikiMapia>, last modified May 19, 2009, printed May 21, 2009, 4 pages.
Zahradnik, Fred, "Dash Express is Innovative, but There's Room for Improvement," at <http://gps.about.com/od/incarportablegp1/fr/dash_review.htm>, from the Internet Archive, dated Nov. 8, 2009, printed Apr. 20, 2012, 3 pages.

\* cited by examiner

MOBILE PRIVATE ASSISTED LOCATION TRACKING

RELATED APPLICATIONS

This application claims the benefit of provisional patent application Ser. No. 61/163,091, filed Mar. 25, 2009, the disclosure of which is hereby incorporated herein by reference in its entirety.

FIELD OF THE DISCLOSURE

The present disclosure relates to tracking a location of a user.

BACKGROUND

Many smartphones have location Application Programming Interfaces (APIs) that are accessible to applications running on the smartphones and hence Location Based Services (LBSs) on the network. Although it is relatively straightforward to retrieve and store a user's location via these APIs, processing historical location of the user usually means sending a string of current locations in time to a LBS over the network. The LBS stores and processes the historical location of the user to provide some service. Storage of the historical location of the user by the LBS ultimately sacrifices some level of user privacy. As such, there is a need for a system and method that enables private location tracking.

SUMMARY

Systems and methods are disclosed for providing private location tracking. In general, a location-aware mobile device includes a location broker. Over time, as a location of the mobile device changes, the location broker generates a number of route fragments each defining the location of the mobile device over a corresponding period of time. The location broker obfuscates the route fragments and sends the obfuscated route fragments to a remote server for storage. At some point, the location broker receives a location tracking request from a requestor. In response, the location broker processes the location tracking request such that one or more obfuscated route fragments that are relevant to the location tracking request are obtained from the remote server and de-obfuscated to recover the corresponding route fragments. The recovered route fragments may then be utilized by the requestor.

In one embodiment, the location broker of the mobile device receives a location tracking request from a requesting device. In response, the location broker obtains one or more obfuscated route fragments that are relevant to the location tracking request from the remote server. In one embodiment, the location tracking request identifies a desired time window or a desired time window is otherwise determined for the location tracking request, and the obfuscated route fragments that are relevant to the location tracking request are one or more obfuscated route fragments that are relevant to the desired time window for the location tracking request. The location broker then returns the obfuscated route fragments and one or more obfuscation values needed to de-obfuscate the obfuscated route fragments to the requesting device. The requesting device is then enabled to de-obfuscate the obfuscated route fragments using the obfuscation values to recover the corresponding route fragments that define a location history, or route, of the user of the mobile device.

In another embodiment, the location broker of the mobile device receives a location tracking request from a requesting device. In response, the location broker obtains one or more obfuscation values needed to de-obfuscate one or more obfuscated route fragments that are relevant to the location tracking request. In one embodiment, the location tracking request identifies a desired time window or a desired time window is otherwise determined for the location tracking request, and the obfuscated route fragments that are relevant to the location tracking request are one or more obfuscated route fragments that are relevant to the desired time window for the location tracking request. The location broker of the mobile device then returns the obfuscation values and, optionally, authorization data to the requesting device. The requesting device then obtains the obfuscated route fragments that are relevant to the location tracking request from the remote server. The requesting device de-obfuscates the obfuscated route fragments using the obfuscation values received from the mobile device to recover the corresponding route fragments that define a location history, or route, of the user of the mobile device.

In yet another embodiment, the location broker of the mobile device receives a location tracking request from a user of the mobile device or another application running on the mobile device. In response, the location broker of the mobile device obtains one or more obfuscated route fragments from the remote server that are relevant to the location tracking request. The location broker of the mobile device then de-obfuscates the obfuscated route fragments to recover the corresponding route fragments that define a location history, or route, of the user of the mobile device.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

Figure 1:
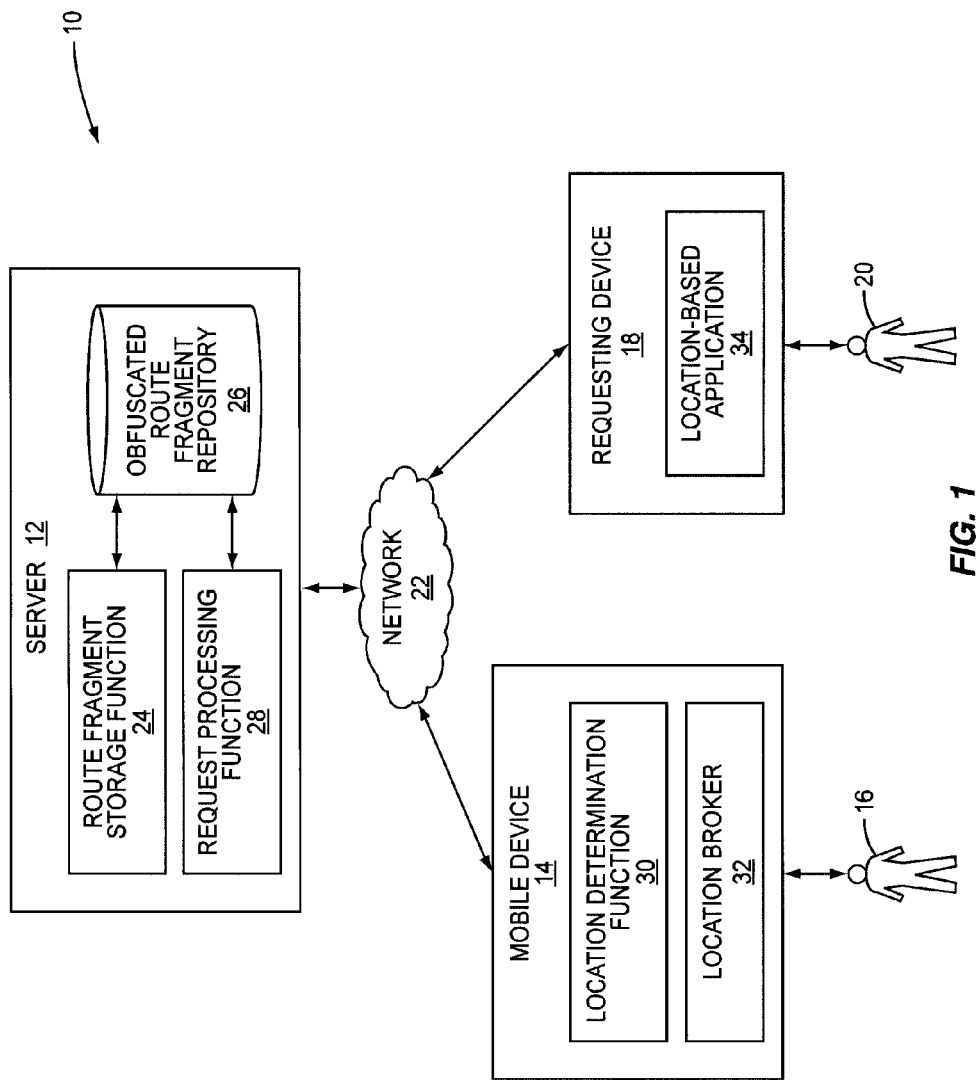
FIG. 1 illustrates a system enabling private location tracking according to one embodiment of the present disclosure.
Figure 3:
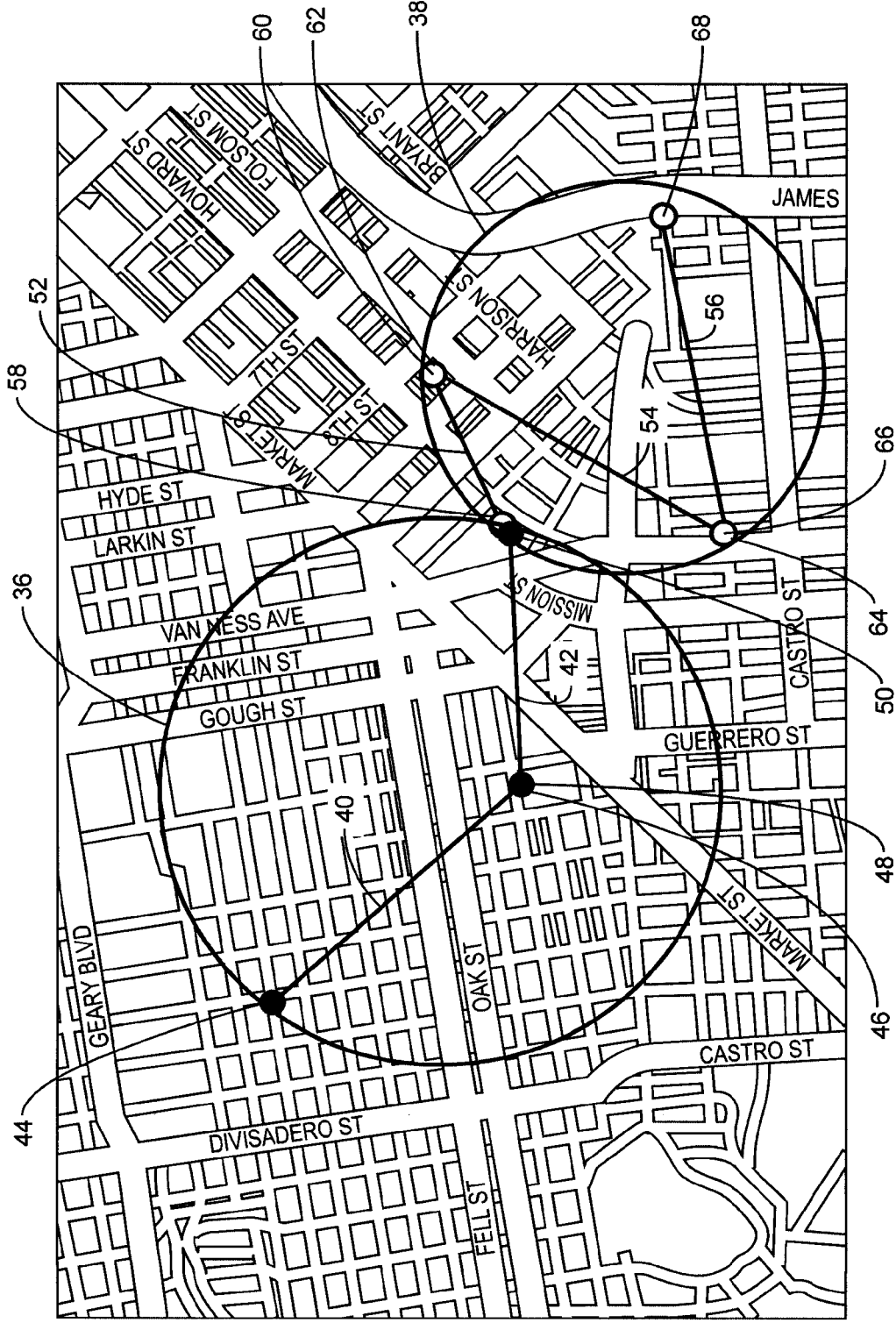
Figure 4:
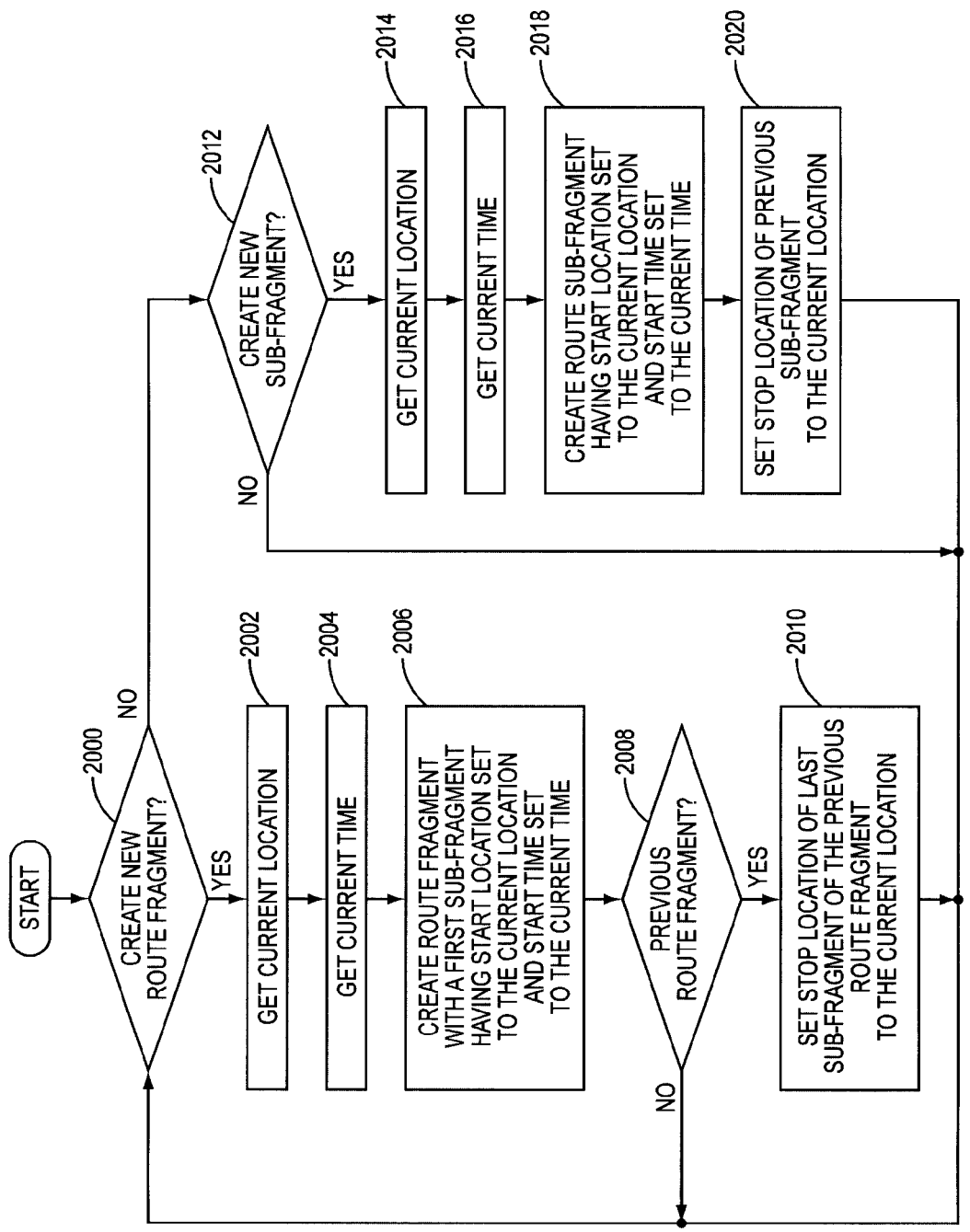
Figure 5:
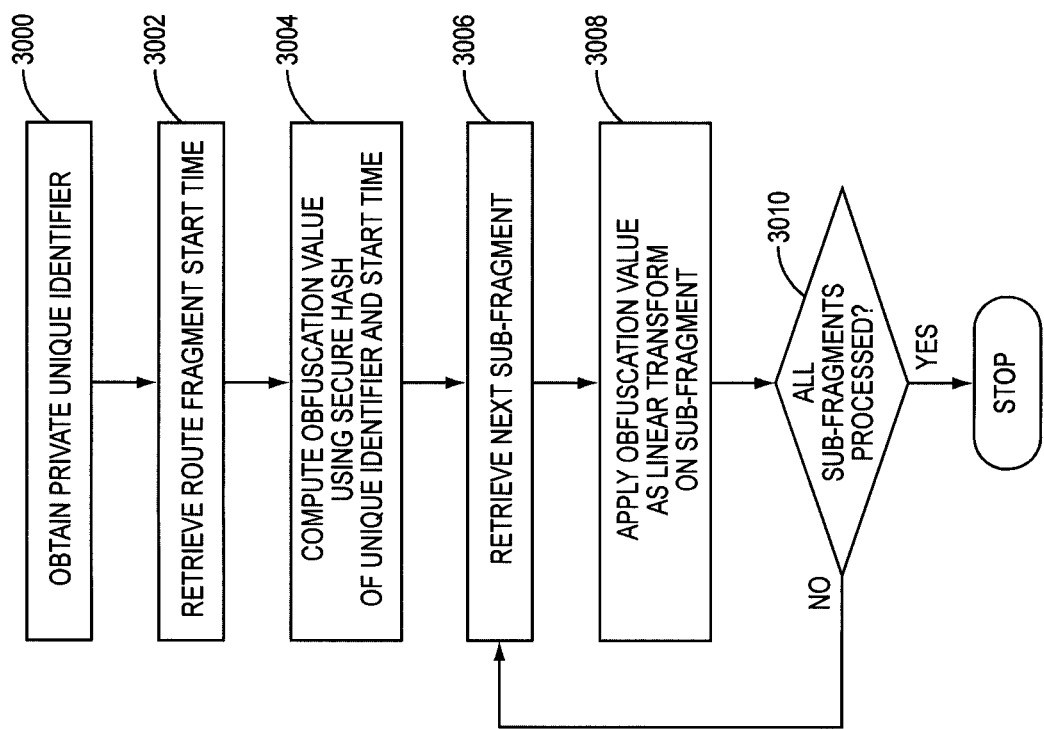
Figure 6:
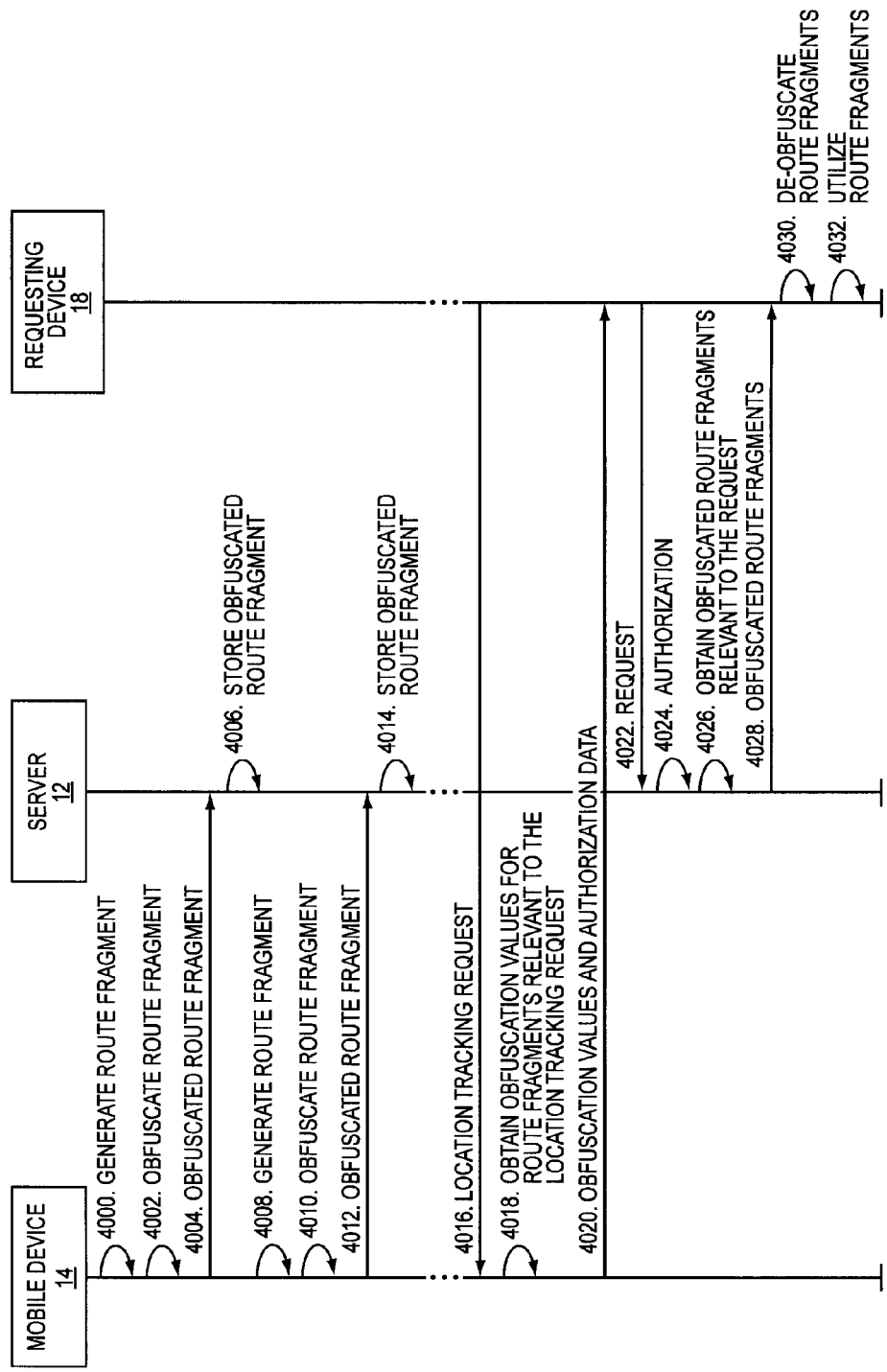
Figure 7:
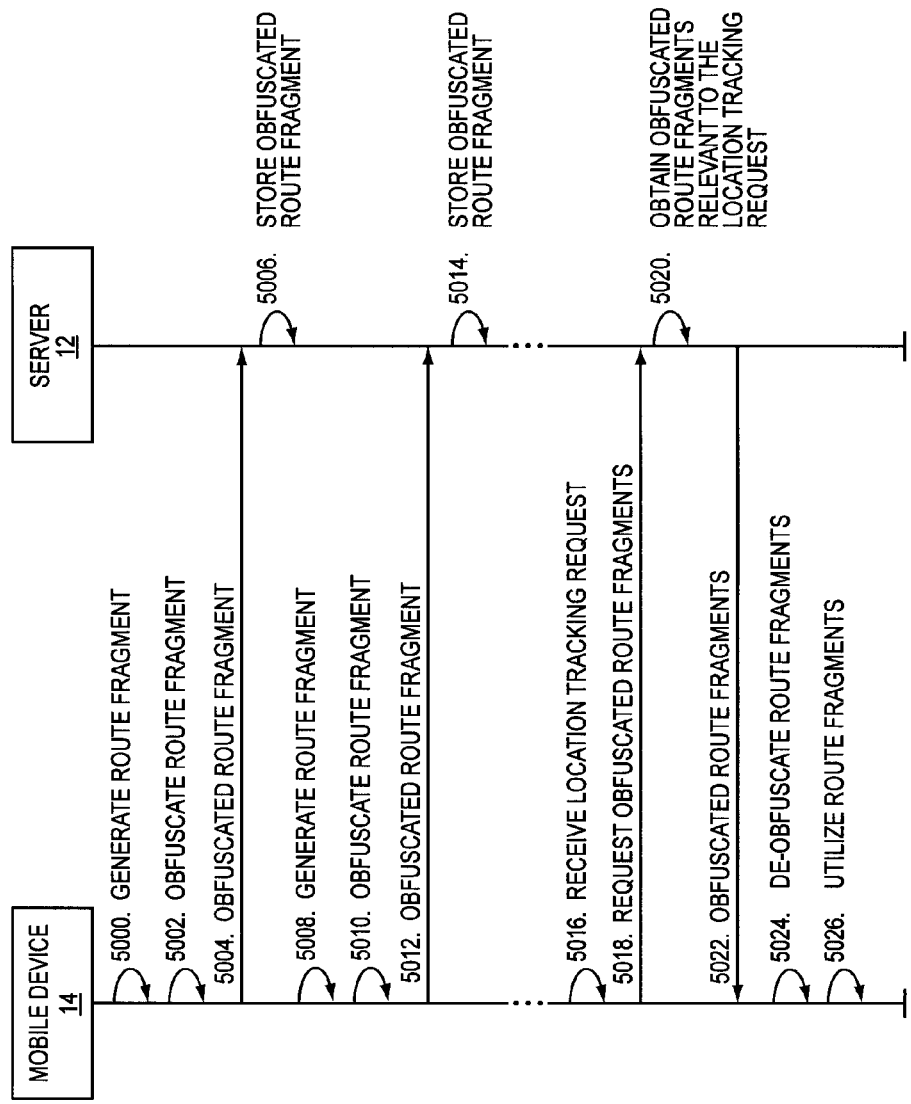
Figure 8:
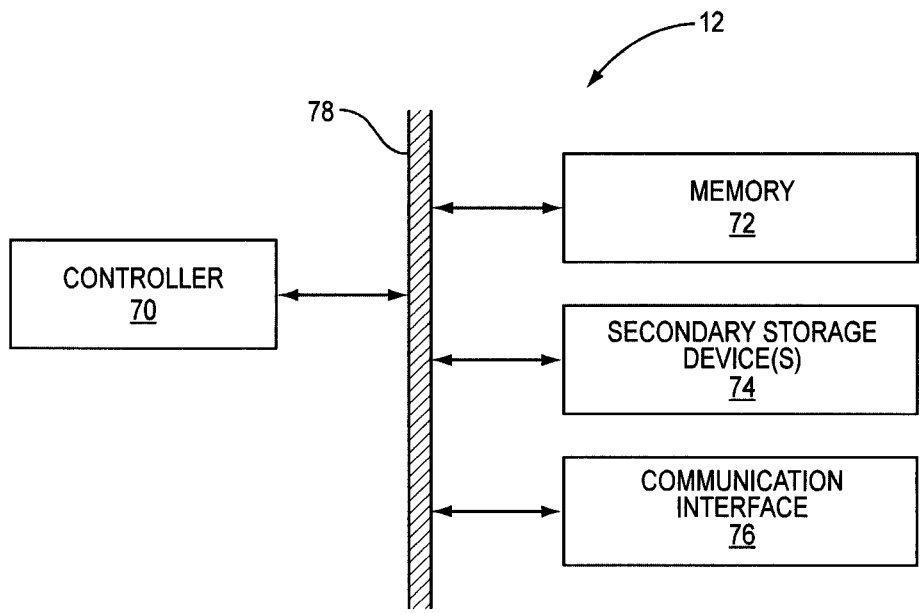
Figure 9:
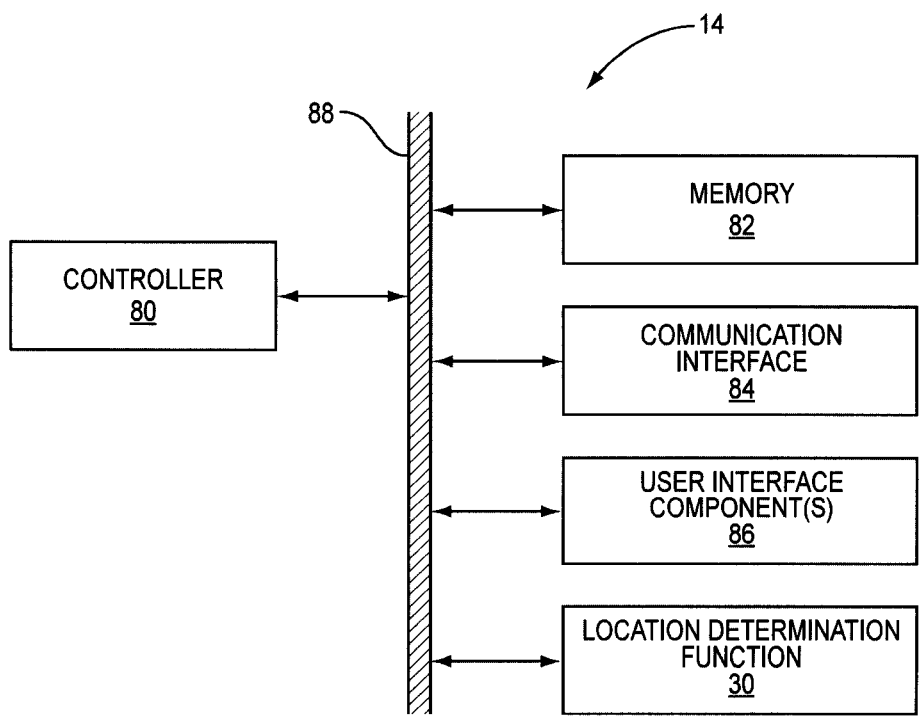
Figure 10:
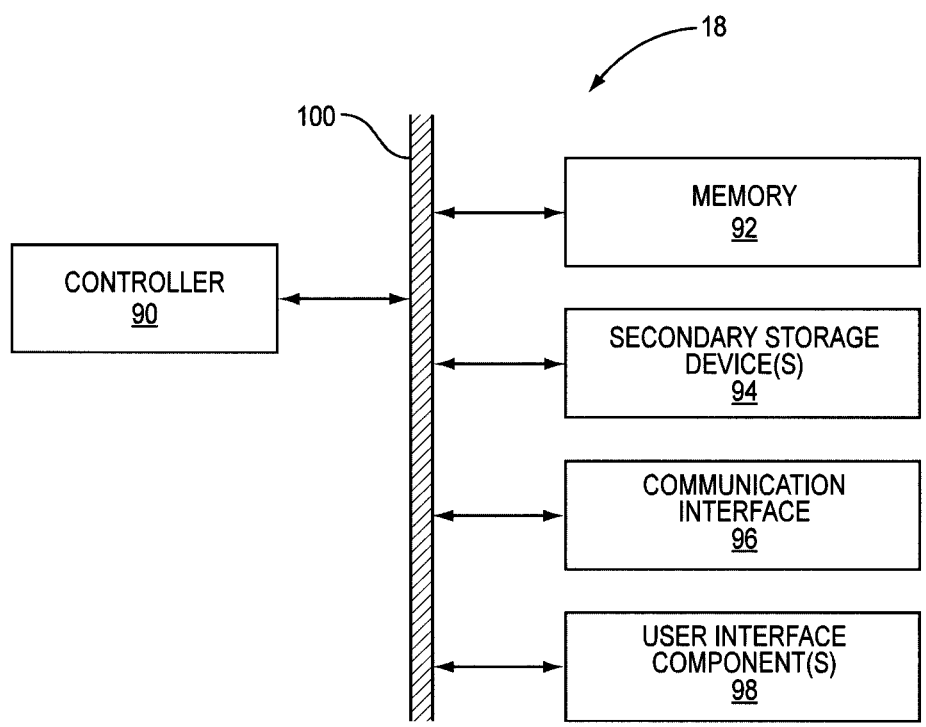

FIG. 3 graphically illustrates a number of route fragments created for the mobile device of FIG. 1 according to one embodiment of the present disclosure;

FIG. 4 is a flow chart illustrating the operation of the location broker to generate route fragments according to one embodiment of the present disclosure;

FIG. 5 illustrates the operation of the location broker to obfuscate a route fragment according to one embodiment of the present disclosure;

FIG. 6 illustrates the operation of the system of FIG. 1 according to a second embodiment of the present disclosure;

FIG. 7 illustrates the operation of the system of FIG. 1 according to a third embodiment of the present disclosure;

FIG. 8 is a block diagram of the server of FIG. 1 according to one embodiment of the present disclosure;

FIG. 9 is a block diagram of the mobile device of FIG. 1 according to one embodiment of the present disclosure; and FIG. 10 is a block diagram of the requesting device of FIG. 1 according to one embodiment of the present disclosure.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

FIG. 1 illustrates a system 10 for providing private location tracking according to one embodiment of the present disclosure. In general, the system 10 includes a server 12, a mobile device 14 having an associated user 16, and a requesting device 18 having an associated user 20. The server 12, the mobile device 14, and the requesting device 18 are connected via a network 22. The network 22 may be any type or combination of networks. For example, in one embodiment, the network 22 is a distributed public network such as the Internet.

The server 12 is a physical server and includes a route fragment storage function 24, an obfuscated route fragment repository 26, and a request processing function 28. The route fragment storage function 24 is preferably implemented in software, but is not limited thereto. In general, as discussed below, the route fragment storage function 24 operates to obtain obfuscated route fragments from the mobile device 14 and store the obfuscated route fragments in the obfuscated route fragment repository 26. Note that while only the mobile device 14 is illustrated for clarity and ease of discussion, it should be appreciated that the system 10 may include any number of mobile devices 14 for which the route fragment storage function 24 obtains obfuscated route fragments and stores those obfuscated route fragments in the obfuscated route fragment repository 26. As used herein, a route fragment is data that defines the location of a user or mobile device over a defined period of time. As further used herein, an obfuscated route fragment is a route fragment that has been obfuscated. As discussed below, obfuscation of a route fragment may be provided by, for example, applying a transformation (e.g., a linear transform) to the route fragment, encrypting the route fragment using a desired cryptography technique (e.g., asymmetric-key cryptography), or the like. By storing only the obfuscated route fragments at the server 12, privacy is maintained with respect to the location of the user 16. Specifically, since the server 12 cannot de-obfuscate the obfuscated route fragments, the server 12 or any entity that legally or illegally gains access to the server 12 cannot use the obfuscated route fragments to track the location of the user 16.

The request processing function 28 of the server 12 is also preferably implemented in software, but is not limited thereto. In general, the request processing function 28 operates to process requests for obfuscated route fragments from the mobile device 14, the requesting device 18, or both. More specifically, upon receiving a request for obfuscated route fragments for a desired time window, the request processing function 28 obtains obfuscated route fragments for the user 16 that are relevant to a desired time window from the obfuscated route fragment repository 26 and returns those obfuscated route fragments to the requestor.

The mobile device 14 is physical device such as, for example, a mobile smartphone (e.g., an APPLE® IPHONE), a tablet computer (e.g., an APPLE® IPAD), or similar location-aware portable device. The mobile device 14 generally includes a location determination function 30 and a location broker 32. The location determination function 30 may be implemented in hardware, software, or a combination thereof. In general, the location determination function 30 operates to determine or otherwise obtain the location of the mobile device 14. For example, the location determination function 30 may be or include a Global Positioning System (GPS) receiver that operates to determine the location of the mobile device 14. As another example, the mobile device 14 may be connected to a cellular telecommunications network, and the location determination function 30 may obtain the location of the mobile device 14 from the cellular telecommunications network.

The location broker 32 of the mobile device 14 is preferably implemented in software, but is not limited thereto. In general, the location broker 32 operates to process the location of the mobile device 14 as determined by the location determination function 30 over time to create route fragments that define the location of the user 16 over corresponding periods of time. More specifically, in the preferred embodiment, the location broker 32 creates a route fragment every N minutes, where N may be, for example, 5 minutes, 10 minutes, 15 minutes, 30 minutes, 60 minutes, or the like. For example, the location broker 32 may create a route fragment every thirty (30) minutes that defines the location of the user 16 during the corresponding thirty (30) minute period. The location broker 32 obfuscates the route fragments and sends the obfuscated route fragments to the server 12 where they are stored in the obfuscated route fragment repository 26.

In addition, the location broker 32 processes location tracking requests from the requesting device 18 and, in some embodiments, the user 16. More specifically, in one embodiment, the location broker 32 receives a location tracking request from the requesting device 18 and then obtains obfuscated route fragments that are relevant to the location tracking request from the server 12. The location broker 32 then de-obfuscates the obfuscated route fragments to provide the corresponding route fragments and then returns the route fragments to the requesting device 18. In another embodiment, the location broker 32 receives a location tracking request from the requesting device 18. The location broker 32 then returns obfuscation values to the requesting device 18 for obfuscated route fragments that are relevant to the location tracking request. The requesting device 18 obtains the obfuscated route fragments from the server 12 and de-obfuscates the obfuscated route fragments using the obfuscation values to recover the route fragments relevant to the location tracking request.

The requesting device 18 is a physical device such as, for example, a personal computer, another mobile device, a server, or the like. As illustrated, the requesting device 18 includes a location-based application 34, which is preferably, but not necessarily, implemented in software. In operation, the location-based application 34 issues a location tracking request to the mobile device 14. In one embodiment, in response to the request, the location-based application 34 receives the route fragments that are relevant to the location tracking request from the mobile device 14. In another embodiment, in response to the request, the location-based application 34 receives one or more obfuscation values for obfuscated route fragments that are relevant to the location tracking request from the mobile device 14. The location-based application 34 then obtains the obfuscated route fragments from the server 12 and de-obfuscates the obfuscated route fragments using the one or more obfuscation values received from the mobile device 14. In either embodiment, once the route fragments are obtained, the location-based application 34 may utilize the route fragments as a location history, or route, of the location of the user 16. For example, the location-based application 34 may be a social networking application that enables the user 20 to track the location of other users in a social network of the user 20 such as, in this example, the user 16. As another example, the location-based application 34 may be a targeted advertising application that provides targeted advertisements to the user 16 based on locations that the user 16 has visited. Note however that these examples are not intended to limit the scope of the present disclosure.

Figure 2:
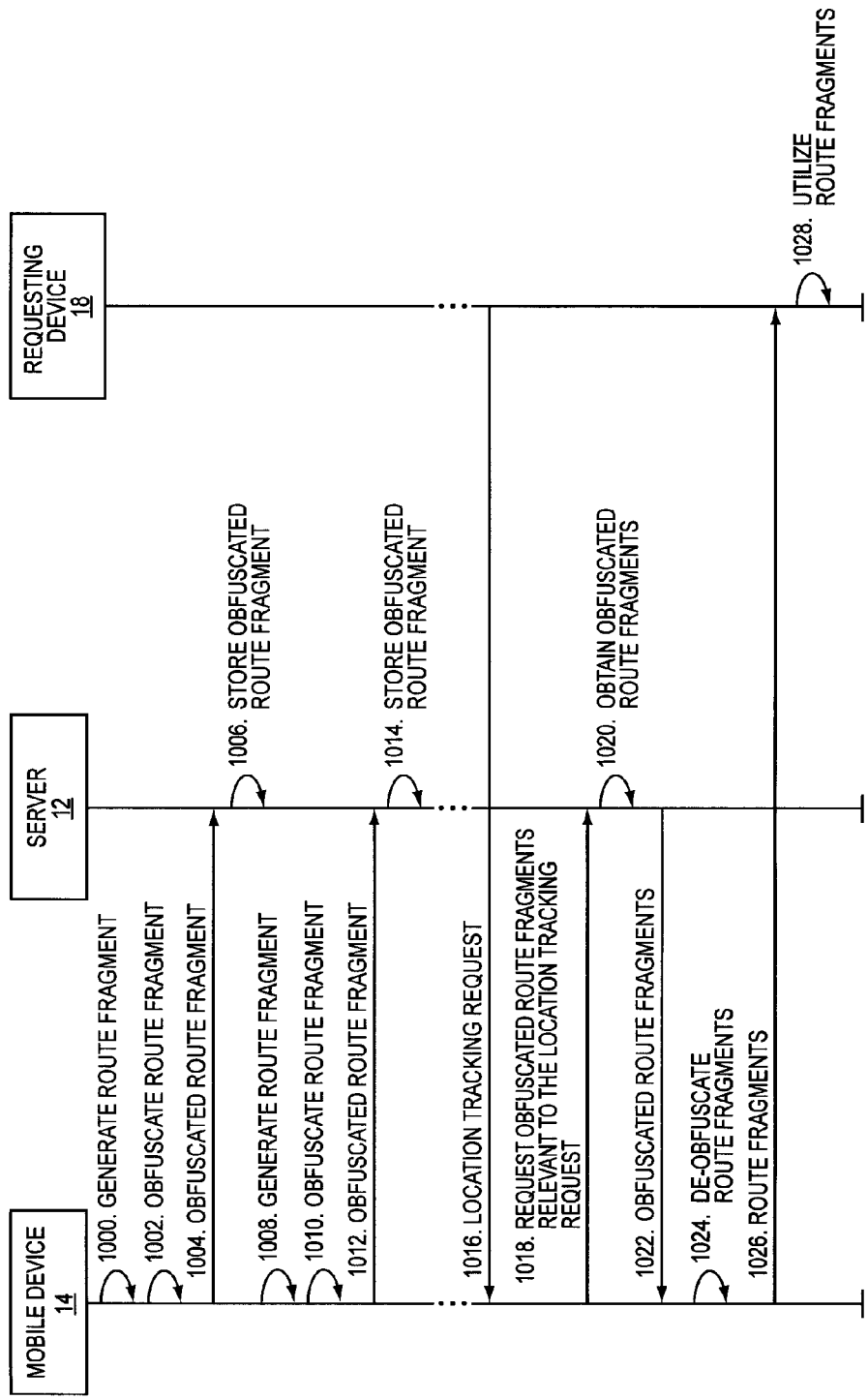
FIG. 2 illustrates the operation of the system of FIG. 1 according to a first embodiment of the present disclosure.

FIG. 2 illustrates the operation of the system 10 of FIG. 1 according to one embodiment of the present disclosure. As illustrated, the mobile device 14, and more specifically the location broker 32, generates a route fragment (step 1000). In general, the route fragment defines the location of the user 16 over a corresponding period of time. In the preferred embodiment, the route fragment includes one or more sub-fragments each defined by a start location, a stop location, and a start time. The start location is the location of the user 16 at the start time for the sub-fragment and the stop location is the location of the user 16 at a stop time for the sub-fragment, which corresponds to a start time of a next sub-fragment, which may be the next sub-fragment for the route fragment or a first sub-fragment for a next route fragment.

For example, FIG. 3 graphically illustrates two such route fragments 36 and 38. The route fragment 36 includes sub-fragments 40 and 42. The sub-fragment 40 is defined by a start location 44, a stop location 46, and a start time identifying when the user 16 was located at the start location 44 of the sub-fragment 40. Likewise, the sub-fragment 42 is defined by a start location 48 that is the same as the stop location 46 of the sub-fragment 40, a stop location 50, and a start time identifying when the user 16 was located at the start location 48 of the sub-fragment 42. Note that the start time of the sub-fragment 40 is also referred to herein as a start time of the route fragment 36. In a similar manner, the route fragment 38 includes sub-fragments 52, 54, and 56. The sub-fragment 52 is defined by a start location 58 which is the same as the stop location 50 of the sub-fragment 42 of the route fragment 36, a stop location 60, and a start time identifying when the user 16 was at the start location 58. The sub-fragment 54 is defined by a start location 62 which is the same as the stop location 60 of the sub-fragment 52, a stop location 64, and a start time identifying when the user 16 was at the start location 62. Lastly, the sub-fragment 56 is defined by a start location 66 which is the same as the stop location 64 of the sub-fragment 54, a stop location 68, and a start time identifying when the user 16 was at the start location 66 of the sub-fragment 56.

In another embodiment, the route fragment may be defined by a list of two or more locations including a start location for the route fragment and a stop location for the route fragment. In addition, the route fragment may include a start time and/or stop time for the route fragment. Alternatively, the route fragment may include a timestamp for each of the locations in the list of locations for the route fragment, where each timestamp defines a time at which the user 16 was at the corresponding location.

Returning to FIG. 2, once the route fragment is generated, the location broker 32 obfuscates the route fragment (step 1002). In general, any suitable technique for obfuscating the route fragment may be used. In one embodiment, a private unique identifier (ID) of the mobile device 14 and the start time for the route fragment are used to compute or otherwise obtain an obfuscation value. The obfuscation value may then be used to obfuscate the route fragment. In one embodiment, obfuscation may be performed by applying the obfuscation value to the locations defining the route fragment (e.g., the start and stop locations for each sub-fragment in the route fragment) as a linear transform. In another embodiment, the locations defining the route fragment may be encrypted using a suitable a cryptography technique (e.g., asymmetric-key cryptography), where the obfuscation value is used as the encryption key. Note that other techniques for obfuscating the route fragment may be used and are to be considered with the scope of the present disclosure. Further, while in the preferred embodiment, the start time of the route fragment is not obfuscated, the present disclosure is not limited thereto.

Next, the location broker 32 sends the obfuscated route fragment to the server 12 (step 1004). In response, the route fragment storage function 24 stores the obfuscated route fragment in the obfuscated route fragment repository 26 (step 1006). Note that the obfuscated route fragment is identified as an obfuscated route fragment of the user 16. For example, the obfuscated route fragment may be stored in association with a public identifier (ID) of the user 16. The public ID of the user 16 may be, for instance, a name of the user 16, a telephone number of the mobile device 14 of the user 16, an identifier derived from the International Mobile Subscriber Identity (IMSI) or International Mobile Equipment Identity (IMEI) of the mobile device 14, or the like.

At this point, the process is repeated such that the location broker 32 generates another route fragment, obfuscates the route fragment, and sends the obfuscated route fragment to the server 12 where the obfuscated route fragment is stored in the obfuscated route fragment repository 26 (steps 1008-1014). This process is repeated such that over time new route fragments continue to be generated, obfuscated, and sent to the server 12 for storage.

At some point, the location broker 32 of the mobile device 14 receives a location tracking request from the location-based application 34 of the requesting device 18 (step 1016). The location tracking request preferably identifies a desired time window for the location tracking request. For example, the desired time window may be relative to the current time (e.g., past day, past 2 days, past week, or the like) or absolute (e.g., Jan. 29, 2010 through Jan. 31, 2010, today from noon until 5 P.M., or the like). Further, the time window may be discrete or reoccurring (e.g., Last Monday through Friday from 8 AM to 9 PM). While not illustrated, the location broker 32 may perform an authorization process to determine whether the location-based application 34 and/or the user 20 is authorized to access the route fragments of the user 16 and, even more specifically, the route fragments of the user 16 relevant to the desired time window for the location tracking request. Authorization may require the location-based application 34 and/or the user 20 to provide appropriate credentials such as, for example, a predetermined password. Note that while in the embodiments discussed herein, the desired time window is preferably identified in the location tracking request, the present disclosure is not limited thereto. In another embodiment, the time window for the location tracking request is determined by the location broker 32 using, for example, system-defined or user-defined criteria. For example, the user 16 may be enabled define time windows that are to be accessible to individual users or groups/classes of users.

In response to receiving the location tracking request and, optionally, authorization of the location-based application 34 and/or the user 20, the location broker 32 of the mobile device 14 sends a request to the server 12 for obfuscated route fragments that are relevant to the desired time window for the location tracking request (step 1018). In one embodiment, the obfuscated route fragments that are relevant to the desired time window for the tracking request are obfuscated route fragments that are stored for the user 16 and that have start times within the desired time window for the tracking request. The request processing function 28 of the server 12 then obtains the obfuscated route fragments stored for the user 16 that are relevant to the desired time window for the location tracking request from the obfuscated route fragment repository 26 and returns those obfuscated route fragments to the location broker 32 of the mobile device 14 (steps 1020 and 1022).

The location broker 32 then de-obfuscates the obfuscated route fragments returned by the server 12 to provide the corresponding route fragments and returns the route fragments to the requesting device 18 (steps 1024 and 1026). The location-based application 34 of the requesting device 18 then utilizes the route fragments (step 1028). For instance, the route fragments may be combined by the location-based application 34 to provide a location history, or route, of the user 16 during the desired time window for the location tracking request. The route of the user 16 may then be presented to the user 20 at the requesting device 18, used to provide an automated service such as targeted advertising, or the like.

FIG. 4 is a flow chart illustrating the operation of the location broker 32 to generate route fragments according to one embodiment of the present disclosure. This process may be used to generate the route fragments in steps 1000 and 1008 of FIG. 2. In this embodiment, each generated route fragment includes one or more sub-fragments, as described above. First, the location broker 32 determines whether it is time to create a new route fragment (step 2000). In the preferred embodiment, the location broker 32 creates route fragments at a predefined absolute times (e.g., 8:00 AM, 8:30 AM, 9:00 AM, etc.). Thus, the location broker 32 determines that it is time to create a route fragment if the current time is one of the predefined absolute times at which a route fragment is to be created. The predefined absolute times may be defined as a list of absolute times. Alternatively, the predefined absolute times may be defined by an absolute starting time (e.g., everyday at 8:00 AM) and a predefined time interval (e.g., 30 minutes) such that route fragments are created at the predefined time interval starting at the absolute starting time.

If it is time to create a new route fragment, the location broker 32 gets the current location of the mobile device 14 from the location determination function 30 (step 2002). In addition, if it has not already done so for step 2000, the location broker 32 gets the current time (step 2004). If the location determination function 30 is a GPS receiver, the location broker 32 may get the current time from the location determination function 30. However, the current time may be obtained using any suitable technique. Next, the location broker 32 creates a route fragment with a first sub-fragment having a start location set to the current location and a start time set to the current time (step 2006).

The location broker 32 also determines whether there is a previous route fragment (step 2008). In other words, the location broker 32 determines whether the route fragment created in step 2006 is the first route fragment created. If there is not a previous route fragment, the process returns to step 2000 and is repeated. However, if there is a previous route fragment, the location broker 32 sets a stop location of the last sub-fragment of the previous route fragment (i.e., the immediately preceding route fragment) to the current location, thereby completing the previous route fragment (step 2010). The process then returns to step 2000 and is repeated.

Returning to step 2000, if it is not time to create a new route fragment, the location broker 32 determines whether it is time to create a new sub-fragment for the current route fragment (step 2012). More specifically, in one embodiment, route fragments are created at the predefined absolute times. Between these predefined absolute times, the location broker 32 may create a number of sub-fragments in response to triggering events. The triggering events may be, for example, detecting that the user 16 has moved to and remained at a particular location for at least a threshold amount of time (e.g., 5 minutes), expiration of a predefined time interval for a sub-fragment (e.g., 5 minutes), initiation by the user 16 directly or indirectly (e.g., via initiation of a location-based Internet search), or the like. If it is not time to create a new sub-fragment, then the process returns to step 2000 and is repeated.

If it is time to create a new sub-fragment, the location broker 32 gets the current location of the mobile device 14 and the current time (steps 2014 and 2016). The location broker 32 then creates a sub-fragment for the current route fragment having a start location set to the current location and a start time set to the current time (step 2018). In addition, the location broker 32 sets a stop location of a previous, or immediately preceding, sub-fragment for the current route fragment to the current location, thereby completing the previous sub-fragment (step 2020). At this point, the process returns to step 2000 and is repeated.

FIG. 5 is a flow chart illustrating the operation of the location broker 32 to obfuscate a route fragment according to one embodiment of the present disclosure. This process may be used to obfuscate the route fragments in steps 1002 and 1010 of FIG. 2. First, the location broker 32 obtains a private unique identifier of the mobile device 14 (step 3000). The private unique identifier may be maintained in hardware or software at the mobile device 14. For example, the private unique identifier may be maintained in an ARM TrustZone and Protected Flash. The location broker 32 also retrieves a start time of the route fragment to be obfuscated (step 3002). In the embodiment described above, the start time of the route fragment is the start time of the first sub-fragment of the route fragment. Next, the location broker 32 computes or otherwise determines an obfuscation value using a secure hash of the private unique identifier and the start time of the route fragment (step 3004). More specifically, in one embodiment, the start time for the route fragment is converted to a millisecond epoch value (i.e., number of milliseconds since Jan. 1, 1970 (midnight UTC/GMT), not counting leap seconds (in ISO 8601: 1970-01-01 T00:00:00 Z)). A hash value is then computed using a secure hashing algorithm, such as SHA-1, of the private unique identifier of the mobile device 14 and the millisecond epoch value for the start time of the route fragment. A predetermined number of the least-significant bits of the hash value may then be selected as the obfuscation value for the route fragment.

The location broker 32 then retrieves the next sub-fragment for the route fragment, which for the first iteration is the first sub-fragment for the route fragment (step 3006). The location broker 32 then applies the obfuscation value as a linear transform on the sub-fragment (step 3008). More specifically, in this embodiment, the sub-fragment includes a start location defined by a latitude and longitude coordinate pair and a stop location defined by another latitude and longitude coordinate pair. The location broker 32 then applies the obfuscation value to the sub-fragment as a linear transform by adding the obfuscation value to both of the latitude and longitude coordinates for the start location and the latitude and longitude coordinates for the stop location of the sub-fragment. Note that while a linear transform is discussed herein, other types of transforms (e.g., non-linear transforms) may be used. Also note that other types of obfuscation techniques may be used such as, for example, asymmetric-key cryptography. Next, the location broker 32 determines whether all sub-fragments for the route fragment have been processed (step 3010). If not, the process returns to step 3006 and is repeated. Once all of the sub-fragments of the route fragment have been processed, or obfuscated, the process ends.

FIG. 6 illustrates the operation of the system 10 of FIG. 1 according to another embodiment of the present disclosure. First, as described above, the location broker 32 of the mobile device 14 generates route fragments, obfuscates the route fragments, and sends the obfuscated route fragments to the server 12 for storage in the obfuscated route fragment repository 26 (steps 4000-4014). At some point, the location broker 32 of the mobile device 14 receives a location tracking request from the location-based application 34 of the requesting device 18 (step 4016). The location tracking request preferably identifies a desired time window for the location tracking request. For example, the desired time window may be relative to the current time (e.g., past day, past 2 days, past week, or the like) or absolute (e.g., Jan. 29, 2010 through Jan. 31, 2010, today from noon until 5 P.M., or the like). While not illustrated, the location broker 32 may perform an authorization process to determine whether the location-based application 34 and/or the user 20 is authorized to access the route fragments of the user 16 and, even more specifically, the route fragments of the user 16 relevant to the time window of the location tracking request. Authorization may require the location-based application 34 and/or the user 20 to provide appropriate credentials such as, for example, a predetermined password.

In response to receiving the location tracking request and, optionally, authorization of the location-based application 34 and/or the user 20, the location broker 32 of the mobile device 14 obtains the obfuscation values used to obfuscate route fragments that are relevant to the time window for the location tracking request (step 4018). More specifically, in the embodiment, route fragments are created at predetermined absolute times (e.g., 8:00 AM, 8:30 AM, etc.). Further, each route fragment is obfuscated using an obfuscation value computed using a secure hash of the private unique identifier of the mobile device 14 and the start time for route fragment. As such, the location broker 32 first determines the predetermined absolute times at which route fragments were created that are within the time window for the location tracking request. The identified predetermined absolute times correspond to the start times for the route fragments that are relevant to the time window for the location tracking request. Then, the location broker 32 computes the obfuscation values for the route fragments using the secure hash of the start times for the route fragments and the private unique identifier of the mobile device 14. Alternatively, if the start times of the route fragments are not known, the location broker 32 may first query the server 12 for the start times of the obfuscated route fragments for the user 16 that are within the time window for the location tracking request. The location broker 32 may then compute the obfuscation values using a secure hash of the start times and the private unique identifier of the mobile device 14.

Next, the location broker 32 returns the obfuscation values and, optionally, authorization data to the location-based application 34 of the requesting device 18 (step 4020). The authorization data may be, for example, a token or credentials enabling the location-based application 34 to request the obfuscated route fragments relevant to the location tracking request from the server 12. For instance, the authorization data may be a one-time password generated using a One Time Password (OTP) technology such as Initiative for Open Authorization (OATH) technology. Using such technology, authorization can be rescinded after an authorized transaction has taken place, thereby increasing the security of the system 10.

In this embodiment, the location-based application 34 of the requesting device 18 sends a request for the obfuscated route fragments relevant to the location tracking request to the server 12 (step 4022). The request includes the time window for the location tracking request and, optionally, the authorization data received from the location broker 32 of the mobile device 14. In response to the request, the request processing function 28 of the server 12 performs an authorization process to determine whether the location-based application 34 is authorized to access the obfuscated route fragments (step 4024). For example, the request processing function 28 may authorize the location-based application 34 if the appropriate token or credentials are provided in the request. Once authorization is complete, the request processing function 28 obtains the obfuscated route fragments for the user 16 that are relevant to the time window provided in the request from the obfuscated route fragment repository 26 (step 4026). The request processing function 28 then returns the obfuscated route fragments to the requesting device 18 (step 4028).

The location-based application 34 of the requesting device 18 then de-obfuscates the obfuscated route fragments using the obfuscation values received from the location broker 32 of the mobile device 14 to recover the route fragments for the user 16 that are relevant to the time window for the location tracking request (step 4030). More specifically, in one embodiment, obfuscation of a route fragment is performed by applying an obfuscation value to the route fragment using a linear transform wherein the obfuscation value is added to the latitude and longitude coordinates defining the start and stop locations for each sub-fragment of the route fragment, as discussed above. In this embodiment, de-obfuscation is performed for each of the obfuscated route fragments received from the server 12 by subtracting the corresponding obfuscation value from the obfuscated latitude and longitude coordinates for each of the obfuscated sub-fragments of the obfuscated route fragment. Once de-obfuscation is complete, the location-based application 34 of the requesting device 18 utilizes the route fragments (step 4032). For instance, the route fragments may be combined by the location-based application 34 to provide a location history, or route, of the user 16 during the time window for the location tracking request. The route of the user 16 may then be presented to the user 20 at the requesting device 18, used to provide an automated service such as targeted advertising, or the like.

FIG. 7 illustrates the operation of the system 10 of FIG. 1 according to another embodiment of the present disclosure. In this embodiment, the location broker 32 of the mobile device 14 enables the mobile device 14 or other applications running on the mobile device 14 to access the route fragments of the user 16. First, as described above, the location broker 32 of the mobile device 14 generates route fragments, obfuscates the route fragments, and sends the obfuscated route fragments to the server 12 for storage in the obfuscated route fragment repository 26 (steps 5000-5014). In this embodiment, at some point, the location broker 32 of the mobile device 14 receives a location tracking request either from the user 16 or another application running on the mobile device 14 (step 5016). The location tracking request preferably identifies a desired time window for the location tracking request. For example, the desired time window may be relative to the current time (e.g., past day, past 2 days, past week, or the like) or absolute (e.g., Jan. 29, 2010 through Jan. 31, 2010, today from noon until 5 P.M., or the like).

In response to receiving the location tracking request, the location broker 32 of the mobile device 14 sends a request to the server 12 for obfuscated route fragments of the user 16 that are relevant to the location tracking request (step 5018). Preferably, the request sent to the server 12 includes the time window for the location tracking request. The request processing function 28 then obtains the obfuscated route fragments relevant to the location tracking request from the obfuscated route fragment repository 26 and returns those obfuscated route fragments to the mobile device 14 (steps 5020 and 5022). In one embodiment, the obfuscated route fragments relevant to the location tracking request are obfuscated route fragments for the user 16 that have start times within the time window identified for the location tracking request.

Upon receiving the obfuscated route fragments, the location broker 32 of the mobile device 14 de-obfuscates the obfuscated route fragments (step 5024). More specifically, for each of the obfuscated route fragments, the location broker 32 obtains the obfuscation value used to generate the obfuscated route fragment and then de-obfuscates the obfuscated route fragment using the obfuscation value. Once de-obfuscation is complete, the mobile device 14 utilizes the route fragments (step 5026). For instance, the route fragments may be combined by the location broker 32 or another application to provide a route of the user 16 during the time window for the location tracking request. The route of the user 16 may then be presented to the user 16 at the mobile device 14, used to provide an automated service such as targeted advertising, or the like.

FIG. 8 is a block diagram of the server 12 according to one embodiment of the present disclosure. As illustrated, the server 12 includes a controller 70 connected to memory 72, one or more secondary storage devices 74, and a communication interface 76 by a bus 78 or similar mechanism. The controller 70 is a microprocessor, digital Application Specific Integrated Circuit (ASIC), Field Programmable Gate Array (FPGA), or the like. In this embodiment, the controller 70 is a microprocessor, and the route fragment storage function 24 and the request processing function 28 are implemented in software and stored in the memory 72 for execution by the controller 70. The secondary storage devices 74 are digital data storage devices such as, for example, one or more hard disk drives. In one embodiment, the obfuscated route fragment repository 26 is implemented in the secondary storage devices 74. The communication interface 76 is a wired or wireless communication interface that communicatively couples the server 12 to the network 22. For example, the communication interface 76 may be an Ethernet interface, local wireless interface such as a wireless interface operating according to one of the suite of IEEE 802.11 standards, or the like.

FIG. 9 is a block diagram of the mobile device 14 according to one embodiment of the present disclosure. As illustrated, the mobile device 14 includes a controller 80 connected to memory 82, a communication interface 84, one or more user interface components 86, and the location determination function 30 by a bus 88 or similar mechanism. The controller 80 is a microprocessor, digital ASIC, FPGA, or the like. In this embodiment, the controller 80 is a microprocessor, and the location broker 32 is implemented in software and stored in the memory 82 for execution by the controller 80. In this embodiment, the location determination function 30 is a hardware component such as, for example, a GPS receiver. The communication interface 84 is a wireless communication interface that communicatively couples the mobile device 14 to the network 22. For example, the communication interface 84 may be a local wireless interface such as a wireless interface operating according to one of the suite of IEEE 802.11 standards, a mobile communications interface such as a cellular telecommunications interface, or the like. In addition, the communication interface 84 may enable the mobile device 14 to communicate directly with the requesting device 18 via a local wireless communication link (e.g., IEEE 802.11 link, Bluetooth link, or the like) to receive location tracking requests and/or to send route fragments or obfuscation values when the requesting device 18 is within a local wireless communication range of the mobile device 14. The one or more user interface components 86 include, for example, a touchscreen, a display, one or more user input components (e.g., a keypad), a speaker, or the like, or any combination thereof.

FIG. 10 is a block diagram of the requesting device 18 according to one embodiment of the present disclosure. As illustrated, the requesting device 18 includes a controller 90 connected to memory 92, one or more secondary storage devices 94, a communication interface 96, and one or more user interface components 98 by a bus 100 or similar mechanism. The controller 90 is a microprocessor, digital ASIC, FPGA, or the like. In this embodiment, the controller 90 is a microprocessor, and the location-based application 34 is implemented in software and stored in the memory 92 for execution by the controller 90. The one or more secondary storage devices 94 are digital storage devices such as, for example, one or more hard disk drives. The communication interface 96 is a wired or wireless communication interface that communicatively couples the requesting device 18 to the network 22. For example, the communication interface 96 may be an Ethernet interface, local wireless interface such as a wireless interface operating according to one of the suite of IEEE 802.11 standards, a mobile communications interface such as a cellular telecommunications interface, or the like. In addition, the communication interface 96 may enable the requesting device 18 to communicate directly with the mobile device 14 via a local wireless communication link (e.g., IEEE 802.11 link, Bluetooth link, or the like) to send location tracking requests and/or to receive route fragments or obfuscation values when the mobile device 14 is within a local wireless communication range of the requesting device 18. The one or more user interface components 98 include, for example, a touchscreen, a display, one or more user input components (e.g., a keypad), a speaker, or the like, or any combination thereof.

Those skilled in the art will recognize improvements and modifications to the preferred embodiments of the present invention. All such improvements and modifications are considered within the scope of the concepts disclosed herein and the claims that follow.

What is claimed is:

1. A method of operation of a mobile device, comprising:
by the mobile device:
generating a plurality of route fragments, each route fragment of the plurality of route fragments defining a location of a user of the mobile device over a corresponding period of time;
obfuscating the plurality of route fragments to provide a plurality of obfuscated route fragments;
sending the plurality of obfuscated route fragments to a remote server for storage by the remote server;

receiving a location tracking request from a remote requestor via a network;

processing the location tracking request such that one or more obfuscated route fragments of the plurality of obfuscated route fragments that are relevant to the location tracking request are obtained from the remote server and de-obfuscated to recover one or more route fragments of the plurality of route fragments corresponding to the one or more obfuscated route fragments; and sending the one or more recovered route fragments to the remote requestor.

2. The method of claim 1 wherein the requestor is a requesting device, and receiving the location tracking request from the requestor comprises receiving the location tracking request from the requesting device.

3. The method of claim 1 wherein the requestor is an application running on the mobile device, and receiving the location tracking request from the requestor comprises receiving the location tracking request from the application running on the mobile device.

4. The method of claim 3 wherein processing the location tracking request comprises:

obtaining the one or more obfuscated route fragments that are relevant to the location tracking request from the remote server;

de-obfuscating the one or more obfuscated route fragments at the mobile device to recover the one or more route fragments corresponding to the one or more obfuscated route fragments; and providing the one or more route fragments to the application running on the mobile device.

5. The method of claim 1 wherein obfuscating the plurality of route fragments comprises, for each route fragment of the plurality of route fragments:

computing an obfuscation value based on a private unique identifier of the mobile device and a time associated with the route fragment; and obfuscating the route fragment based on the obfuscation value.

6. The method of claim 5 wherein the time associated with the route fragment is a start time for the route fragment.

7. The method of claim 5 wherein the route fragment is defined by one or more locations, and obfuscating the route fragment based on the obfuscation value comprises applying the obfuscation value to one or more locations that define the route fragment.

8. The method of claim 7 wherein the one or more locations that define the route fragment comprise at least one start location and at least one stop location.

9. The method of claim 7 wherein the route fragment is defined by one or more sub-fragments each having a start location and a stop location, and wherein applying the obfuscation value to one or more locations that define the route fragment comprises applying the obfuscation value to the start location and stop location of each of the one or more sub-fragments for the route fragment.

10. The method of claim 7 wherein applying the obfuscation value to one or more locations that define the route fragment comprises applying the obfuscation value to the one or more locations that define the route fragment as a linear transform.

11. The method of claim 7 wherein applying the obfuscation value to one or more locations that define the route fragment comprises encrypting each of the one or more locations based on the obfuscation value;

12. The method of claim 5 wherein computing the obfuscation value comprises: computing a hash value for the private unique identifier of the mobile device and the time associated with the route fragment based on a secure hash algorithm; and selecting at least a portion of the hash value as the obfuscation value.

13. The method of claim 1 wherein obfuscating the plurality of route fragments comprises obfuscating each of the plurality of route fragments using a different obfuscation value.

14. The method of claim 1 wherein generating the plurality of route fragments comprises generating a route fragment at each of a plurality of predetermined times to thereby provide the plurality of route fragments.

15. A mobile device comprising:

a communication interface communicatively coupling the mobile device to a remote server via a network; and a controller associated with the communication interface and adapted to:

generate a plurality of route fragments, each route fragment of the plurality of route fragments defining a location of a user of the mobile device over a corresponding period of time;

obfuscate the plurality of route fragments to provide a plurality of obfuscated route fragments;

send the plurality of obfuscated route fragments to the remote server for storage by the remote server;

receiving a location tracking request from a remote requestor via a network;

processing the location tracking request such that one or more obfuscated route fragments of the plurality of obfuscated route fragments that are relevant to the location tracking request are obtained from the remote server and de-obfuscated to recover one or more route fragments of the plurality of route fragments corresponding to the one or more obfuscated route fragments; and sending the one or more recovered route fragments to the remote requestor.

16. A non-transitory computer readable medium storing software for instructing a controller of a mobile device to:

generate a plurality of route fragments, each route fragment of the plurality of route fragments defining a location of a user of the mobile device over a corresponding period of time;

obfuscate the plurality of route fragments to provide a plurality of obfuscated route fragments;

send the plurality of obfuscated route fragments to a remote server for storage by the remote server;

receiving a location tracking request from a remote requestor via a network;

processing the location tracking request such that one or more obfuscated route fragments of the plurality of obfuscated route fragments that are relevant to the location tracking request are obtained from the remote server and de-obfuscated to recover one or more route fragments of the plurality of route fragments corresponding to the one or more obfuscated route fragments; and sending the one or more recovered route fragments to the remote requestor.

* * * * *